Nov. 5, 1963   J. A. HACHEY   3,109,276
FRUIT PICKING DEVICE
Filed Aug. 9, 1961   2 Sheets-Sheet 1

JOSEPH A. HACHEY
INVENTOR

BY Norman S. Blodgett
ATTORNEY

Nov. 5, 1963  J. A. HACHEY  3,109,276
FRUIT PICKING DEVICE
Filed Aug. 9, 1961  2 Sheets-Sheet 2

JOSEPH A. HACHEY
INVENTOR

BY *Norman S. Blodgett*
ATTORNEY

United States Patent Office 3,109,276
Patented Nov. 5, 1963

3,109,276
FRUIT PICKING DEVICE
Joseph A. Hachey, 21 Ripley St., Worcester, Mass.
Filed Aug. 9, 1961, Ser. No. 130,419
8 Claims. (Cl. 56—332)

This invention relates to a fruit picking device and more particulary to apparatus arranged to remove the fruit from trees without damage to the fruit.

Among the commonly-used apparatus for picking fruit, such as oranges, apples and the like, are devices which are mounted on the end of a long pole. One device of this type consists of a group of resilient fingers; the operator grasps the fruit by pressing the group of fingers against the fruit until they separate and permit the fruit to go between them. Then, the shaft is rotated to twist the stem of the fruit and to free the fruit. It is necessary then to use one's hand to remove the fruit from between the fingers. Devices of this kind are apt to damage the fruit and they slow down the picking operation. These and other difficulties experienced with the prior art devices are obviated in a novel manner by the present invention.

It is, therefore, an outstanding object of the invention to provide a fruit picking device in which it is necessary to bring very little force to bear against the fruit.

Another object of this invention is the provision of a fruit picking device in which the fruit is not damaged.

A further object of the present invention is the provision of a device for picking fruit with which the fruit may be released without the operator using his hands on the device.

It is another object of the instant invention to provide a fruit picking device for use on the end of an elongated pole in which the fruit may be released while the operator continues to hold the end of the pole opposite the end to which the device is attached.

It is a still further object of the invention to provide a fruit picking device which grasps the fruit when the device is presented to the fruit by a sideways motion.

A still further object of this invention is the provision of a device for picking fruit in which the fruit is grasped gently in an enclosure and the device is rotated to twist and break the stem of the fruit.

It is a still further object of the present invention to provide a fruit picking device for use with an elongated pole, which device is simple and effective to manufacture and to operate and which requires a minimum of maintenance.

With these and other objects in view, as will be apparent to those skilled in the art, the invention resides in the combination of parts set forth in the specification and covered by the claims appended hereto.

A character of the invention, however, may be best understood by reference to one of its structural forms as illustrated by the accompanying drawings in which.

Figure 1:
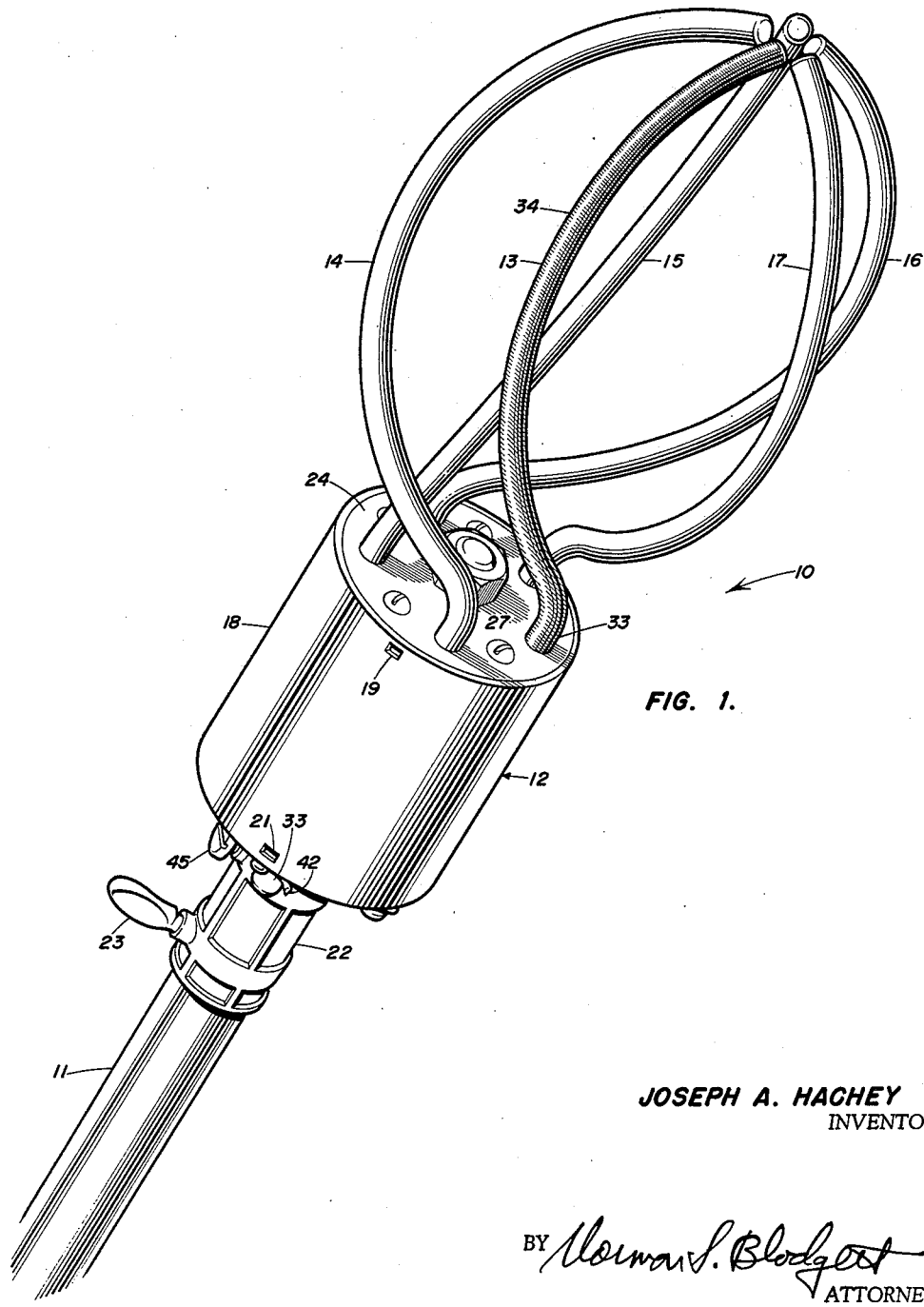
FIG. 1 is a perspective view of a fruit picking device embodying the principles of the present invention.

Referring first to FIG. 1, wherein are best shown the general features of the invention, the fruit picking device, indicated by the reference numeral 10, is shown in use with an elongated pole 11. The device consists of a head 12 from which extends five fingers, 13, 14, 15, 16, and 17. The interior of the head is covered during ordinary use by a sleeve 18 having punched-out tabs 19 and 21 which extend inwardly of the sleeve. From the lower end of the head 12 extends a tubular coupling 22 having a thumb screw 23 by which it is fastened to the end of the pole 11.

Figure 2:
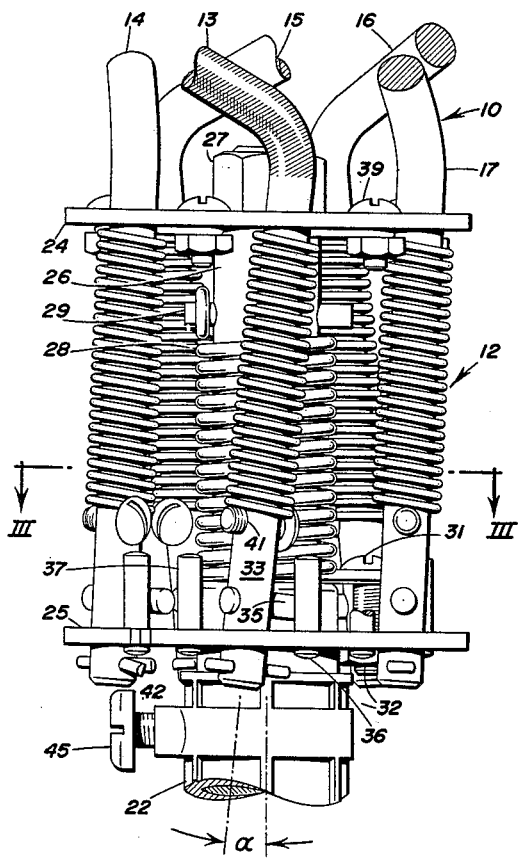
FIG. 2 is an elevational view of a portion of the device with a cover removed.

Referring now to FIG. 2, which shows the head 12 with the sleeve 18 removed, it can be seen that the head is provided with two disc-like plates 24 and 25 through which extends a central shaft 26 on the lower end of which is attached the coupling 22. At its upper end the shaft 26 has a reduced diameter and extends through the plate 24 and is provided with a threaded upper portion on which a nut 27 is threaded to lock the plate 24 in place. The shaft passes through a circular aperture in the center of the plate 25 but the plate is free to rotate relative to the shaft. However, it is biased in one direction by a coil spring 28 which is fastened to the shaft 26 above its intermediate point by means of a pin 29, the other end of the spring 28 being attached to a bolt 31 which extends upwardly from the plate 25 extends through it and is fastened to it by means of a nut 32 underneath the plate. In this figure of the drawings it is clear that each of the fingers has a lower straight portion which extends through the two plates 24 and 25 and a curved portion which extends outwardly above the plate 24. For instance, the finger 13 is provided with a straight portion 33 and a curved portion 34; the rest of the fingers 14, 15, 16, and 17 are similarly formed. The upper plate 24 is provided with five circular apertures to receive the fingers, while the plate 25 is similarly provided with five circular apertures, the apertures in both cases being arranged in circles of exactly the same dameter concentric with the shaft 26. The apertures in the lower plate 25, instead of lying directly under the apertures in the plate 24, are usually displaced from such projected positions by the fact that the spring 28 causes a torsion of the lower table and twisting relative to that of the upper table. When the straight portion 33 of the finger 13 is passed through the two holes, it extends at a slight angle α to the axis of the shaft 26. A suitable stop means is, of course, provided to prevent the table 25 from being twisted under the action of the spring 28 to a position which is too great. The straight portion 33 of the finger 13 is provided with an outwardly extending pin 35 which, in one position of rotation of the finger, strikes against an upwardly-extending pin 36 fastened to the table 25 and in the other position of rotation strikes against a simliar pin 37. These pins, therefore, define the limits of the motion of the finger. Now, extending around the straight portion 33 of the finger 13 is a coil spring 38, one end of which is fastened to a bolt 39 which extends through the table 24 and the other end of which is fastened to a cap screw 41 which extends through the lower portion of the straight portion 33 of the finger 13. Below the table 25 the lower end of the finger 13 is provided with a cotter pin 42. In a similar manner, all of the fingers 14, 15, 16, and 17 are also provided with light coil springs similar in nature to the coil spring 38 of the finger 13 and their straight portions extend at slight angles as does the straight portion 33 of the finger 13. Furthermore, the upper ends of their coil springs are fastened to the table 24 and at the lower end their coil springs are fastened to their straight portions. They are also all provided with cotter pins below the table 25 to lock them against removal. It should be noted, however, that the coil spring 38 associated with the finger 13 is considerably weaker than the coil springs of the other fingers and the finger 13 is painted red or otherwise indicated as being of a special nature.

Figure 3:
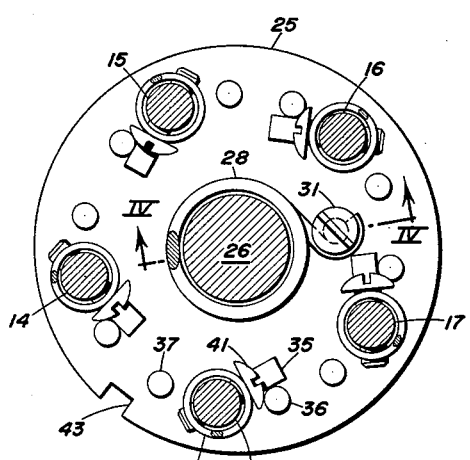
FIG. 3 is a horizontal sectional view of the device taken on the line III—III of FIG. 2.

In FIG. 3 it can be seen that the table 25 is provided with a notch 43 to permit removal of the sleeve 18 by reception of the tabs 19 and 21. As is best evident in FIG. 1, the curved portion 34 of the finger 13 is practically a semi-circle which is attached to the straight portion 33. Because of the inclined condition of the straight portion 33, however, it is not necessary for the curved portion to be a complete semi-circle for the end of the finger 13 to be closely adjacent to the similar ends of the fingers 14, 15, 16 and 17. It will be evident from the above description that relative adjustment of the table 25 relative to the table 24 will cause the angle alpha to be also adjusted. This will cause the enclosure bounded by the curved portions of the fingers 13, 14, 15, 16 and 17 to vary also to handle different sizes of fruit.

Figure 4:
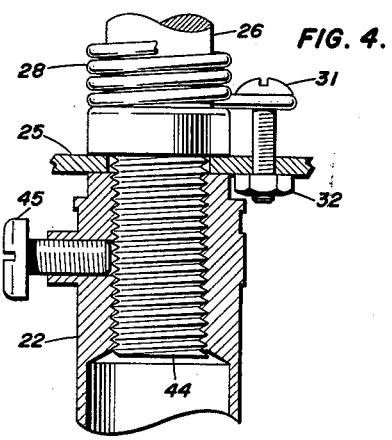
FIG. 4 is a sectional view of the invention taken on the line IV—IV of FIG. 3.

Referring to FIG. 4, it can be seen that the shaft 26 is provided with a shoulder at its lower end and a reduced portion 44 which extends through the aperture in the plate 25 and is provided with threads. The coupling 22 is threaded to the reduced portion and is provided with a set screw 45.

Figure 5:
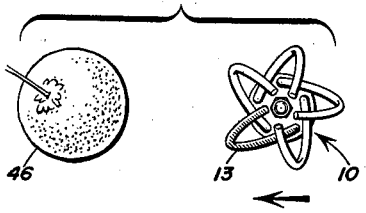
FIGS. 5, 6, and 7 show successive steps in the operation of the device.
Figure 6:
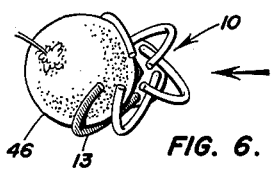
Figure 7:
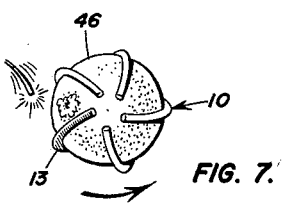

The operation of the apparatus will now be readily understood in view of the above description. Referring particularly to FIGS. 5, 6, and 7, when the device 10 is mounted on the end of the pole 11, it may be advanced toward a fruit 46. It is particularly advantageous to face the device 10 so that the finger 13 (which, it will be remembered, is provided with a weak spring 38) approaches the fruit first. The fruit approaches the finger 13, strikes the curved portion 34 so that the finger rotates outwardly about the axis provided by its straight portion 33. This pressure is against the bias of the spring 38 (which wishes the finger to rotate inwardly so that the pin 35 strikes the stop pin 36). The fruit, however, rotates the finger 13 counter-clockwise as shown in FIG. 6 and this opens the enclosure formed by all of the fingers and permits the fruit to advance inwardly until it occupies the position more or less coaxial with the head. At that time, the finger 13 may rotate back to its original position, thus enclosing the fruit. It is only necessary, then, to rotate the pole 11 and the device 10 in a counter-clockwise direction, as shown in FIG. 7, to twist the stem of the fruit and break it so that the fruit is free of the tree. In order to release the fruit from the enclosure, it is only necessary to swing the pole 11 downwardly and strike the curved portion 34 of the finger 13 against the edge of the basket in which the fruit is to be placed. If one is careful, the finger 13 will swing out of the way without the basket touching the fruit and the opening thus provided will permit the fruit to roll out of the enclosure into the basket.

In order to handle various sizes of fruit, it is only necessary to loosen the set screw 45 so that the coupling 22 may be rotated and screwed away from the shoulder at the lower end of the shaft 26. This frees the plate 25 and the torsional action of the spring 28 will rotate it to an extreme position at which the spring 28 will be entirely without tension, or in other words, without biasing effect between the upper plate 24 and the lower plate 25. At that time, by a study of the geometric situation, it will be realized that the curved portions of the fingers will have been moved outwardly a considerable extent, so that they enclose a very much larger sphere and, therefore, are capable of capturing and trapping a much larger fuit. Now, by rotating the table 25 to successive positions of greater and greater tension of the coil spring 28 the normal position of the fingers will be brought closer and closer together until their outer ends touch, similar to the position shown in FIG. 1. In the position in which the fingers are closest together (and, therefore, may be used with the smallest size of fruit), the angle α may be considered as in a positive position. However, other positions of rotation of the table 25 will cause the angle α to become zero at an intermediate position and then go to the other side of the axis to a negative angle α. In the most extreme position, the fingers are furthest apart; in this condition, the outer ends of the fingers are also much farther apart and the fruit which may be enclosed would be of a much larger size in the order of a grapefruit or the like.

It will be found that, after the coupling 22 has been loosened from the lower end of the shaft 26, the adjustment of the fingers is best accomplished by grasping the fingers and pressing them inwardly until they occupy the desired position for the particular size of fruit which is to be picked. At the selected position, the sleeve 22 is rotated to act as a nut to lock the plate 25 against the shoulder at the lower end of the shaft 26. Then, the set screw 45 is used to positively lock the coupling in position on the shaft.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. A fruit picking device, comprising a head having a central shaft, a plurality of fingers attached to the head for pivotal movement on axes inclined slightly to the axis of the shaft, and spring means associated with the fingers to resist the said pivotal movement.

2. A fruit picking device adapted to be attached to an elongated handle, comprising a head having a central shaft, a plurality of fingers arranged in an enclosing group attached to the head for pivotal movement on axes inclined slightly to the axis of the shaft, and spring means associated with the fingers to resist the said pivotal movement.

3. A fruit picking device adapted to be attached to an elongated handle, comprising a head having two spaced parallel plates and a central shaft, a plurality of fingers extending through the plates for pivotal movement on axes inclined slightly to the axis of the said central shaft, each finger having a straight portion which determines the said pivotal movement and a curved portion forming an enclosure with the curved portion of the other fingers, and spring means associated with each of the fingers to resist the said pivotal movement, the spring means associated with one of the fingers being weaker than the others.

4. A fruit picking device as set forth in claim 3, wherein the plates are circular and the central shaft extends through their centers.

5. A fruit picking device as set forth in claim 3 wherein the fingers are evenly spaced about the said shaft with each curved portion lying in a plane which is tangential to an imaginary cone coaxial with the shaft.

6. A fruit picking device as set forth in claim 3 in which the straight portions of the fingers extend through apertures formed in a circle in one plate and through apertures formed in a similar circle in the second plate, the last-named apertures being displaced along their circle from the projection of the first-named apertures on the second plate.

7. A fruit picking device, comprising a head having a central shaft, a group of fingers attached to the head for pivotal movement on axes inclined slightly to the axis of the shaft, spring means associated with the fingers to resist the said pivotal movement, and means associated with said head to adjust the inclination of the axes to adjust the size of the fruit receiving space defined by said group.

8. A fruit picking device adapted to be attached to an elongated handle, comprising a head having two spaced parallel plates and a central shaft, a plurality of fingers extending through the plates for pivotal movement on axes extending longitudinally of the shaft, each finger having a straight portion which determines the said pivotal movement and a curved portion forming an enclosure with the curved portion of the other fingers, spring means associated with each of the fingers to resist the said pivotal movement, the spring means associated with one of the fingers being weaker than the others, and means associated with said head to adjust the relative positions of the plates about the shaft to change the inclination of the axes and the size of the enclosure.

References Cited in the file of this patent

UNITED STATES PATENTS

| | | |
|---|---|---|
| 925,212 | McConville | June 15, 1909 |
| 2,581,236 | Cardinale | Jan. 1, 1952 |